Inventor:
Harold T. Avery

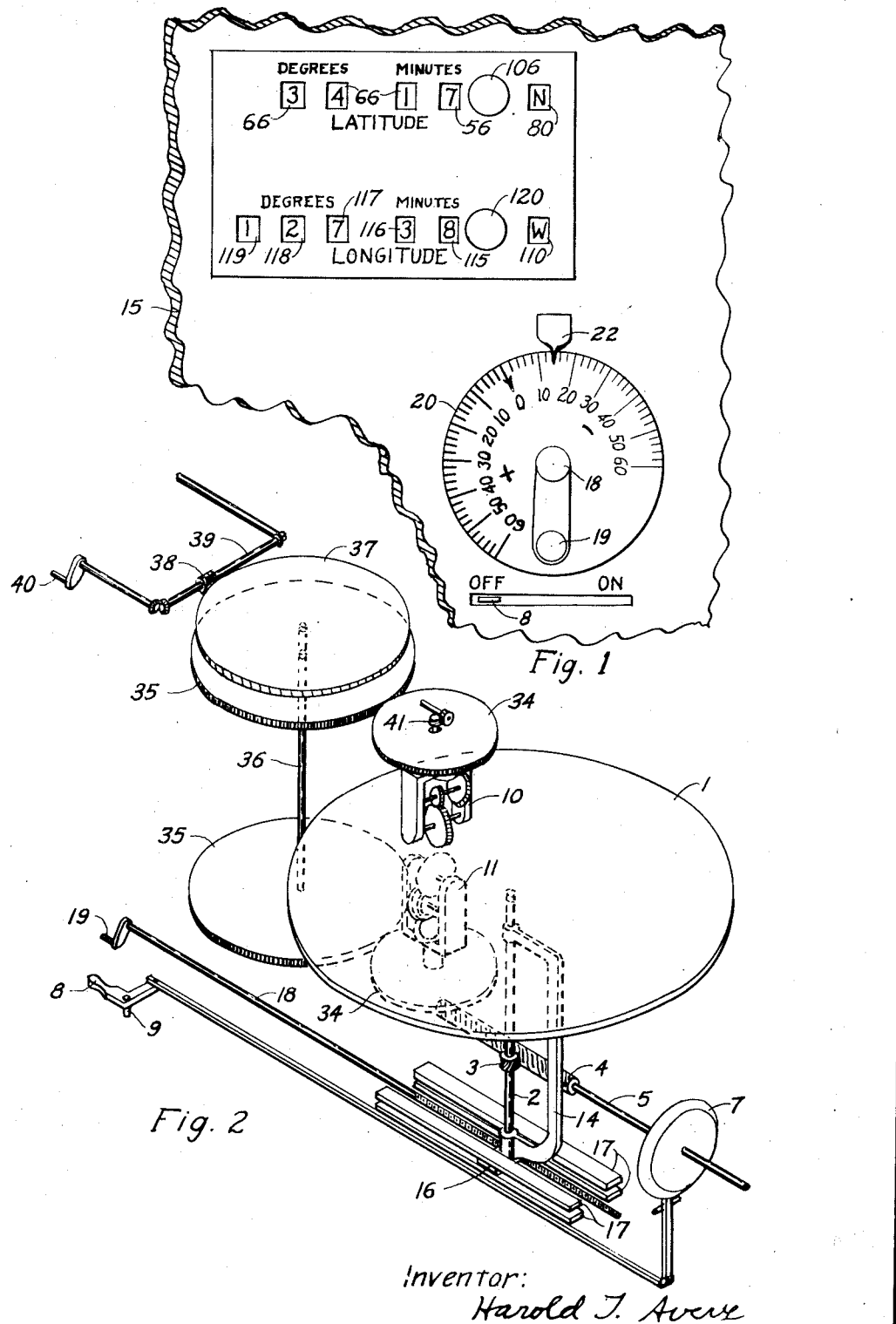

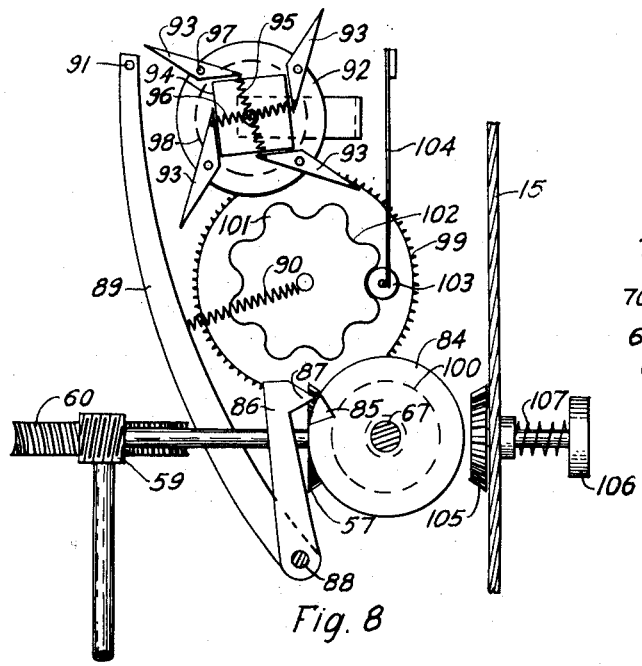

June 19, 1934.                H. T. AVERY                1,963,457
                    LATITUDE AND LONGITUDE METER
                    Filed Sept. 24, 1927        5 Sheets-Sheet 5
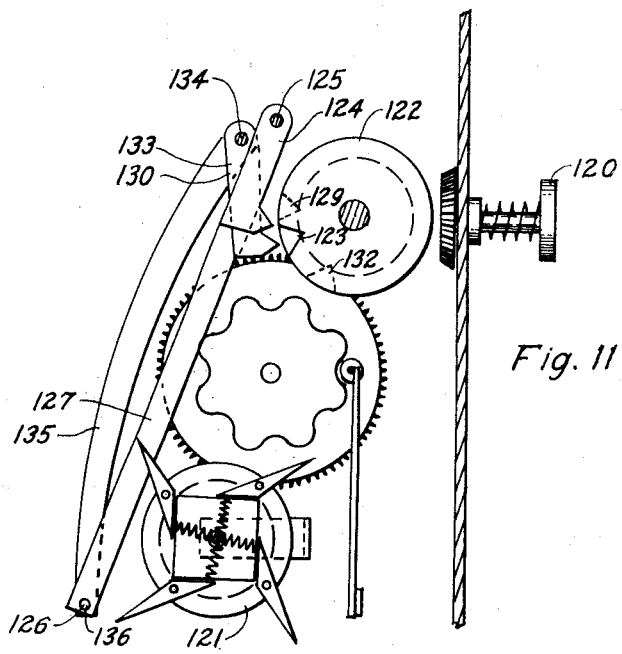
Fig. 11
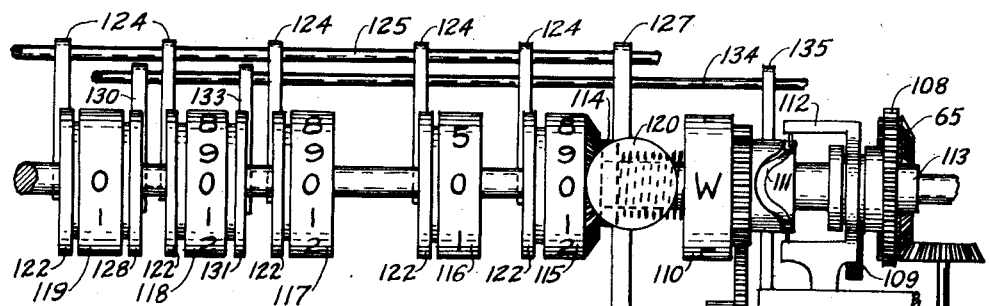
Fig. 10
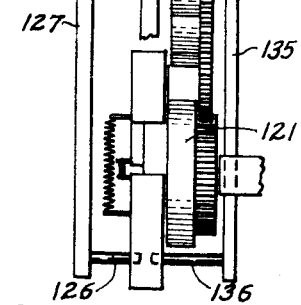
Inventor:
Harold T. Avery Patented June 19, 1934

1,963,457

UNITED STATES PATENT OFFICE 1,963,457

LATITUDE AND LONGITUDE METER

Harold T. Avery, Oakland, Calif.

Application September 24, 1927, Serial No. 221,732

59 Claims. (Cl. 235—61)

This invention relates to a device adapted to be mounted on a dirigible vehicle and capable of automatically registering the latitude and longitude of the vehicle. The device is particularly adapted for use on aircraft.

The objects of this invention are:

1. The provision on a dirigible vehicle of means for automatically registering the latitude and longitude of the vehicle throughout its movements.

2. The provision in a latitude and longitude meter of mechanism adapted to automatically correct for the variation of the unit of longitude with changes of latitude.

3. The provision in a latitude and longitude meter of means for correcting for the variation in the speed of the vehicle due to longitudinal motion of the medium in which the vehicle moves.

4. The provision in conjunction with a latitude and longitude meter of means for correcting for magnetic variation of the compass and for lateral drift of the vehicle in a manner adapted to eliminate the effect of these factors upon the meter.

5. The provision in a latitude and longitude meter of means for automatically indicating the hemisphere of each registration.

6. The provision in a latitude meter of means for automatically reversing the dials, and the indication of the hemisphere, when the dials register zero latitude.

7. The provision in a longitude meter of means for automatically reversing the dials, and the indication of the hemisphere, whenever the dials register zero or 180° 00'.

8. The provision in a latitude and longitude meter of means for conveniently correcting the readings registered, to any desired figure.

Other objects and advantages will hereinafter appear.

In addition to the above novel results, several constructional features of the invention will be apparent from the following specifications and claims. The invention consists in the novel combination of parts as hereinafter set forth.

A preferred embodiment of the invention, particularly applicable to aircraft but also applicable to other vehicles, is described in the following specification and illustrated in the accompanying drawings. The broad scope of the invention is particularly set forth in the appended claims.

In the drawings:

Fig. 1 is a front elevation (that is looking toward the face of the instrument board) of the portion of the instrument board containing the latitude and longitude meter and the lineal-distance adjustor.

Fig. 2 is a perspective view, looking downward from the right rear showing a portion of the mechanism, including particularly the lineal-distance transmitting assembly and related parts, the projected-distance transmitting assemblies, and the mechanism connecting these assemblies to the course setting mechanism.

Fig. 7 is a front elevation of the latitude registering dials and reversing mechanism, with the face of the meter removed.

Fig. 8 is a left side elevation of a portion of the same mechanism.

Fig. 9 is a right side elevation of a portion of the same mechanism.

Fig. 10 is a front elevation of the longitude registering dials and reversing mechanism, with the face of the meter removed.

Fig. 11 is a left side elevation of the same mechanism.

A. GENERAL DESCRIPTION OF APPARATUS

Figure 3:
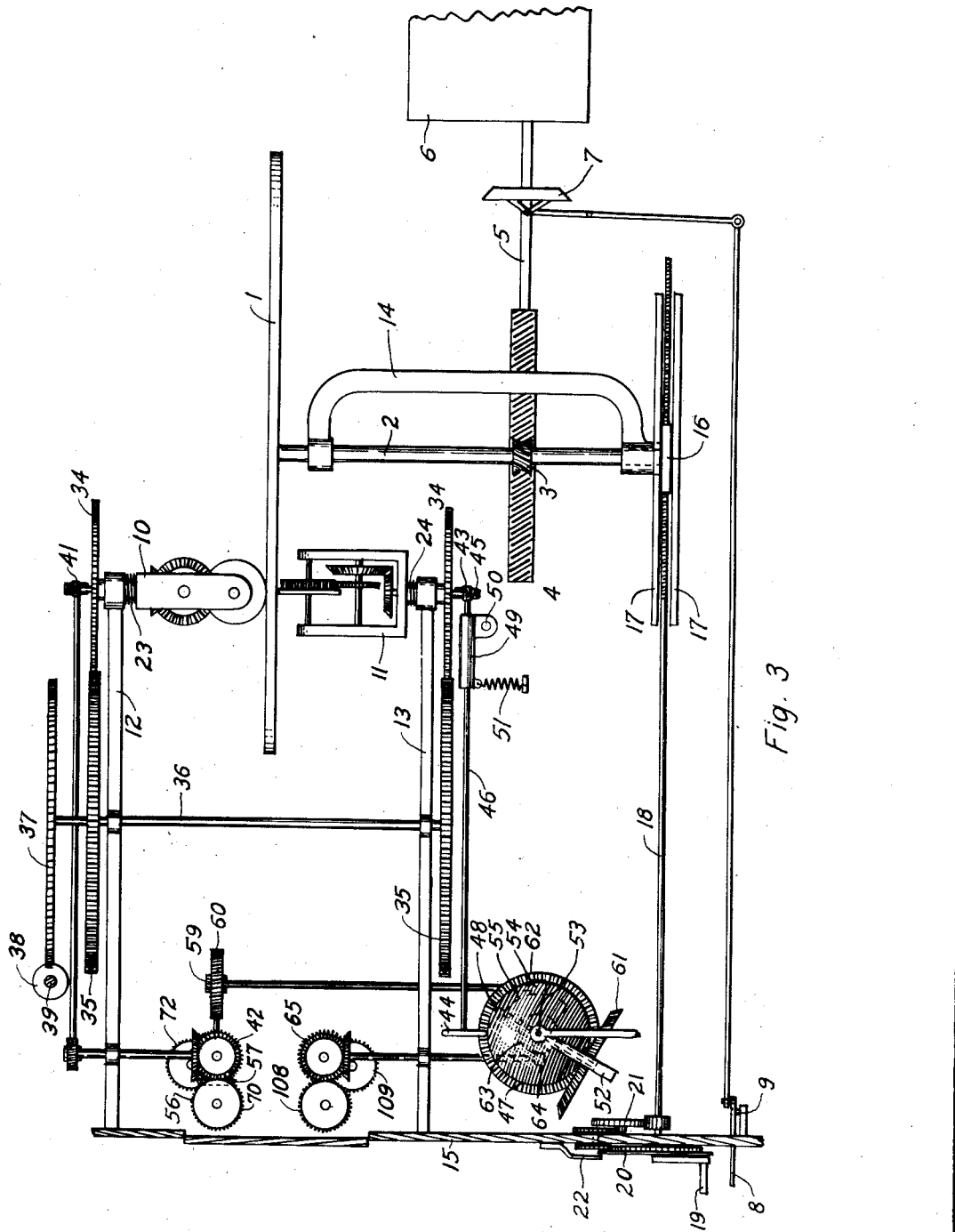
Fig. 3 is a right side elevation of a portion of the mechanism, including particularly the lineal-distance transmitting assembly and related parts, the projected-distance transmitting assemblies, and the longitude-conversion assembly.

The latitude and longitude meter consists primarily of the following parts:

1. A lineal-distance transmitting assembly adapted to transmit motion approximately in proportion to the lineal distance travelled by the vehicle. This assembly may be actuated either by mechanism operated by the motion of the vehicle through the most stable medium with which it is in contact, or directly by the source of power which propels the vehicle. In my preferred embodiment I provide for this assembly to be driven directly by the engine which propels the vehicle, at a speed proportional to the engine speed. In conjunction with this assembly I provide a clutch adapted to render the entire apparatus operative or inoperative at the option of the operator. This allows for instance, of the meter, when installed on an airplane, being disconnected while the engine is being warmed up and the plane held stationary. I also provide in conjunction with this assembly an adjustor adapted to vary the ratio of the engine speed to the rate of lineal motion transmitted to the remaining portions of the mechanism. On an aircraft installation this adjustor is especially adaptable to making allowance for head and tail winds, which particularly vary the ratio of ground speed to engine speed.

2. Two projected-distance transmitting assemblies adapted to transmit motion in proportion to the projection onto the meridian and parallel of latitude, respectively, of the lineal distance travelled. Each of these assemblies includes a disc contacting with a portion of the lineal-distance transmitting assembly, and perpendicular thereto. In conjunction with these assemblies I provide means for so orienting them that the discs of the respective assemblies make angles with the direction of motion of the lineal-distance transmitting assembly at the point of contact equal respectively to the angles that the path of motion of the vehicle makes with the meridian and the parallel of latitude passing through the vehicle.

3. A longitude-conversion assembly adapted to convert motion proportional to the distance travelled in longitude into motion proportional to the angular measure of longitude traversed. This assembly is so positioned by the latitude dials as to properly correct for the change with latitude of the lineal length of the angular unit of longitude.

4. Latitude dials, actuated by the proper projected-distance transmitting assembly, and adapted to register the latitude of the vehicle. In conjunction with these dials I provide convenient means for setting them by hand, so that the operator may correctly set the latitude of the starting point, and may adjust the reading whenever he secures by direct observation or other means a check on the latitude. I also provide in conjunction with these dials means for indicating whether the latitude registered is a North or a South latitude, and means for reversing the indication and the direction of operation of the dials when zero latitude is reached.

5. Longitude dials, actuated by the proper projected-distance transmitting assembly through the medium of the longitude-conversion assembly. I provide means for hand setting these dials similar to that provided in conjunction with the latitude dials. I also provide means for indicating whether the longitude registered is an east or a west longitude, and means for reversing the indication and the direction of operation of the dials whenever a longitude of 0° 00′ or of 180° 00′ is registered.

B. DETAILED DESCRIPTION OF PREFERRED EMBODIMENT

1. *Lineal-distance transmitting assembly*

In my preferred embodiment, the lineal-distance transmitting assembly consists of horizontal disc 1 centrally supported on and rigid with rotatable vertical shaft 2, rigid with which is worm gear 3 driven by worm 4, which in turn is rigid with shaft 5, which is directly driven by engine 6 of the vehicle on which the meter is assumed to be mounted. With non-reversible engines as customarily used in airplanes and many other vehicles, this will result in disc 1 being always rotated in the same direction.

In order to allow of rendering the assembly operative or inoperative at will clutch 7 is inserted in shaft 5 between engines 6 and worm 4. This clutch may be of any type adapted to make the two portions of shaft 5 act as one continuous shaft when the clutch is "on" and to completely disconnect the two portions of the shaft from each other when the clutch is "off". I claim no novelty relative to the particular type of clutch to be used for the purpose. The clutch is arranged to be operated by the movement of lever 8 on pivot 9 (see Figs. 1, 2, and 3,) and is arranged to be connected when lever 8 is in the position marked "On" (Fig. 1) and disconnected when lever 8 is in the position marked "Off".

The lineal-distance transmitting assembly transmits its motion to two projected-distance transmitting assemblies 10 and 11 which are arranged to contact with the upper and lower surfaces, respectively, of disc 1. Assembly 11 is arranged to contact with the disc at a point directly beneath the point of contact of assembly 10, so that the direction and amount of motion of disc 1 will be exactly the same at each point of contact. The rates of motion at various points on the surface of the disc will be, for a given speed of rotation of the disc, proportional to the radius from axis 2 to the respective points. Therefore variations in the ratio of the engine speed to the actual ground speed of the vehicle may be corrected for by varying the radius to the points of contact of the projected-distance transmitting assemblies.

To permit of such variation I provide supports 12 and 13 rigid with the framework of the vehicle adapted to horizontally restrain assemblies 10 and 11, respectively, while axis 2 of the lineal-distance transmitting assembly is positioned by support 14, in which it rotates and which is arranged to be horizontally slidable in a direction perpendicular to the instrument board 15, projections 16 (rigid with support 14) extending between horizontal guides 17. To allow of accurately positioning support 14 and axis 2, threaded shaft 18 passes horizontally through the lower portion of the support, meshing with it, so that the rotation of this shaft in one direction or the other will feed the support backward or forward thereby increasing or decreasing the effective radius to the points of contact of the projected-distance transmitting assemblies, thus acting as an adjustor for the lineal-distance transmission. Handle 19 is rigidly attached to shaft 18 in front of the instrument board, to allow of conveniently rotating the shaft. Provision is made for engine 6 to drive disc 1 with axis 2 in any position the adjustor may place it, by making worm 4 long enough to mesh with worm gear 3 in any position that gear may assume.

In order to conveniently keep track of the change of position of axis 2, and to definitely indicate the effective setting, I provide disc 20, rotatable upon shaft 18 in front of the instrument board, and actuated by the rotation of the shaft through a train of gears 21, the arrangement being such that the angular displacement of disc 20 is proportional to that of shaft 18, but very much less in amount. Disc 20 may be graduated in any convenient way to read against pointer 22 rigid with the instrument board.

With the lineal-distance transmitting assembly and adjustor arranged as above outlined, proper allowance may be conveniently made by the rotation of handle 19 for any factors affecting the ratio of engine speed to ground speed, as for instance the effect of head or tail winds on an aircraft, so that the amount of movement of the surface of disc 1 at its points of contact with assemblies 10 and 11 may be maintained proportional to the lineal distance traversed by the vehicle.

2. Projected-distance transmitting assemblies

Contacting with disc 1 of the lineal-distance transmitting assembly, at a distance from axis 2 properly proportioned to the ground speed of the vehicle in the manner just described, are two projected-distance transmitting assemblies, 10 and 11. Assembly 10, used to transmit motion to the latitude dials is supported above disc 1 by arm 12 rigid with the framework of the vehicle, in such a manner that while it is completely restrained from horizontal translation, it may be rotated about a vertical axis or displaced vertically with respect to the support. It is however, held against disc 1 with a uniform pressure by spring 23. Assembly 11 is similarly supported beneath disc 1 by arm 13 and held against the disc by spring 24.

Figure 4:
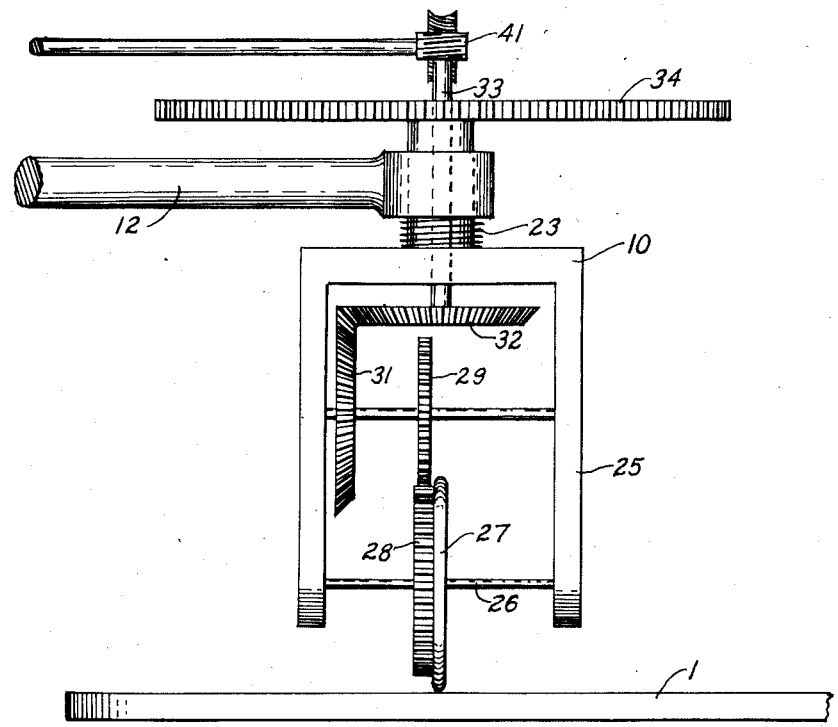
Fig. 4 is an elevation of a projected-distance transmitting assembly.

Each of the projected-distance transmitting assemblies includes a supporting framework 25 in which an axis 26 is horizontally mounted (see Fig. 4). Disc 27, perpendicular to axis 26, is rotatably supported by the axis so as to be at all times perpendicular to and in contact with disc 1 at a point in line with the central vertical axis of the assembly. Rigid with disc 27 is gear 28 which meshes with gear 29, which in turn is so mounted as to be rigid with bevel gear 31. This bevel gear meshes with horizontal bevel gear 32 which is rigid with shaft 33. Shaft 33 is positioned to coincide with the central vertical axis of the assembly. It will be noted that the entire arrangement is such that any rotary movement that disc 27 may receive from disc 1 will be transmitted to shaft 33, and that the entire assembly may be rotatably displaced in its support without changing the point of contact of disc 27 with disc 1, and without changing the position of shaft 33 except to give it a rotatable displacement equal to that of the assembly as a whole.

To permit of proper orientation of assemblies 10 and 11 I provide, rigid with each framework 25, a gear 34, each meshing with a gear 35 (see Fig. 2). These two gears 35 are rigid with a common vertical shaft 36 with which worm gear 37 is also rigid. This worm gear is arranged to be actuated by worm 38 rigid with controller shaft 39. This preferred embodiment of my latitude and longitude meter is arranged to be operated in conjunction with an automatic steering device such as that covered by my copending application No. 200,630 filed June 22, 1927 (Patent No. 1,882,730). As set forth in detail in the specifications accompanying that application, the course to be followed is set by the rotation of shaft 39 (therein designated by numeral 24) by means of controller handle 40 (therein designated by numeral 5), and provision is made for correcting for magnetic variation and for drift between the portion of shaft 39 directly actuated by handle 40 and the directional element proper, so that the resultant path of the vehicle is maintained on a course having the true bearing set by controller handle 40. As indicated in that application a convenient arrangement is to have each complete revolution of handle 40 produce a 10° change in course. In any case worm 38 is arranged to give such an angular displacement to worm gear 37 that the resulting angular displacement of gears 34 and assemblies 10 and 11 will be equal in amount to the corresponding change in the course of the vehicle.

Disc 27 of assembly 10 is placed in a plane exactly perpendicular to that of the similar disc of assembly 11, and the assemblies are so connected to shaft 39 that the disc of the former assembly will be in a plane radial to disc 1, and the disc of the latter assembly in a plane tangential to the circle of disc 1 passing through the point of contact, when the vehicle is on a due east or west course, while when it is on a north or south course the disc of the former assembly will be tangential and that of the latter radial. In fact the arrangement is such that disc 27 of assembly 11 will always be inclined to the radius of disc 1 through its point of contact at an angle equal to that which the path of the vehicle makes with the meridian, while the similar disc of assembly 10 will always be inclined to this same radius by the complementary angle. Thus when the vehicle is moving on an east or west course the full movement of disc 1 is transmitted through assembly 11 to the longitude dials, disc 27 of that assembly being placed tangentially and the rate of movement of its periphery being exactly equal to that of the portion of disc 1 with which it contacts, while disc 27 of assembly 10 being radial to disc 1 receives no motion at all and therefore transmits none to the latitude dials. Similarly when the ship is on a north or south course the full value of the lineal motion is transmitted to the latitude dials and none to the longitude dials. For intermediate courses the rate of motion transmitted to each disc 27 will be equal to the value of the velocity of disc 1 (at the point of contact) projected onto the plane of disc 27, which will be numerically equal to that velocity times the sine of the angle between disc 27 and the radius of disc 1 through the point of contact, each disc 27 being actuated by disc 1 just as the wheel of a planimeter is actuated by the surface over which it passes.

The rate the vehicle moves through latitude is equal to the ground speed of the vehicle times the cosine of the angle its path makes with the meridian. The rate of rotation of disc 27 of assembly 10 is equal to the velocity of disc 1 at the point of contact times the cosine of this same angle. Since the velocity of disc 1 at the point of contact may, as previously outlined, be maintained proportional to the true ground speed of the vehicle, it is evident that the rate of motion transmittted by assembly 10 will be proportional to the rate the vehicle moves through latitude, and when the course so changes as to reverse the direction of the movement of the vehicle through latitude, the direction of motion transmitted by assembly 10 will reverse due to the fact that the change of course will so rotate assembly 10 as to incline the opposite edge of disc 27 in the direction toward which disc 1 is rotating. Similarly the rate of of motion transmitted by assembly 11 will be proportional to the rate of lineal movement of the vehicle through longitude, being equal to the velocity of disc 1 at the point of contact times the sine of the angle that the path of the vehicle makes with the meridian, and the direction of motion transmitted for easterly courses will be opposite to that transmitted for westerly courses.

To transmit the motion of assembly 10 to the latitude dials I provide worm 41 rigid with shaft 33 which is arranged to drive gear 42 of the latitude dial assembly through a direct train of shafts and gearing. The motion of assembly 11 is transmitted by a similar worm 43 rigid with shaft 33 of that assembly to disc 44 of the longitude-conversion assembly through worm gear 45 and shaft 46.

3. Longitude-conversion assembly

Figures 5, 6:
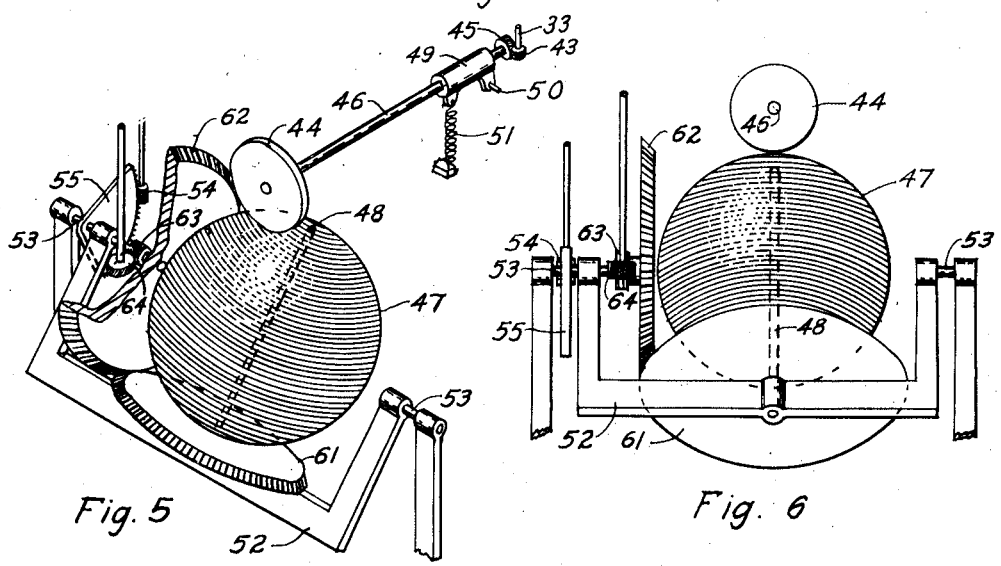
Fig. 5 is a perspective view of the longitude-conversion assembly, looking downward from the right front.
Fig. 6 is a front elevation of the longitude-conversion assembly.

Disc 44 is arranged to rotate sphere 47 on its axis 48 by friction with the surface of the sphere (see Figs. 3, 5, and 6). In order to keep the pressure of the disc against the sphere uniform, mounting 49 in which shaft 46 rotates is pivotally supported on fixed axis 50 and held by spring 51 in a position adapted to give firm pressure of the disc against the sphere.

Axis 48 is rigidly held in the plane of yoke 52, which in turn is supported by trunnions 53, the two trunnions being placed in the same straight line through the center of sphere 47, perpendicular to axis 48. Thus when yoke 52 is rotated on trunnions 53 the inclination of axis 48 is changed without any lateral displacement of sphere 47. The sphere, yoke, and trunnions are so positioned with respect to shaft 46 and disc 44 that shaft 46 lies in the plane which is described by axis 48 as the yoke is rotated on its trunnions, the line of the trunnions being perpendicular to this common plane and in the plane of disc 44. The center of the sphere lies on the intersection of these two planes.

Yoke 52 is adapted to be rotated on its trunnions so as to change the inclination of axis 48 by the rotation of worm 54 which meshes with geared quadrant 55 rigid with yoke 52. Worm 54 is connected by means of proper shafts and gearing to latitude dial 56 in such a manner that the rotation of that dial will transmit to yoke 52 an angular displacement equal in amount to the change of latitude registered. In my preferred embodiment the connecting means includes bevel gear 57 meshing with bevel gear 58 which is rigid with dial 56 (see Figs. 7, 8, and 3), and worm 59 which is rigid with gear 57 and actuates worm gear 60, which in turn is rigid with worm 54. Thus if dial 56 registers minutes of latitude, and one complete revolution of the dial changes the latitude registration by ten minutes, one revolution of the dial would rotate worm 54 by the proper amount to produce a ten minute displacement of yoke 52 and axis 48. These parts are so positioned that when the latitude dials read 90° 00' disc 44 contacts with sphere 47 at the extremity of axis 48 (the axis then being vertical in my preferred embodiment). Then when the dials read 00° 00' disc 44 will contact with the sphere on the great circle of the sphere perpendicular to axis 48 (the axis then being horizontal in my preferred embodiment). For any intermediate positions axis 48 will be inclined to its last mentioned position at an equal angle to the latitude registered, and disc 44 will contact with a circle of sphere 47 the size of which will bear the same ratio to the great circle of the sphere as the circle of latitude at the latitude registered bears to the great circle of the earth, which ratio will be the same as that of the length of a degree of longitude at the latitude registered to the length of a degree of longitude at the equator.

Since sphere 47 is driven by the rotation of disc 44 contacting therewith, and since such contact will necessarily be made along the circle cut by passing a plane through the point of contact perpendicular to axis 48, the rate of rotation of sphere 47 will bear to the rate of rotation of disc 44 the reciprocal of the ratio of the size of that circle to that of the circumference of the disc. Therefore, as the latitude registration increases the relative rate of rotation of sphere 47 will increase in proportion to the decrease in length of the degree of longitude, and will be proportional to the angular measure of longitude traversed if the rate of rotation of disc 44 is proportional to the distance traversed in longitude. If the general accuracy of a particular embodiment of the entire instrument should justify such refinement sphere 47 may be shaped as an oblate spheroid similar in shape to the earth, and a more exact conversion to angular value of longitude obtained than would be the case if it were exactly spherical.

I provide for transmitting the rotation of sphere 47 to the longitude dials regardless of the position of yoke 52 as follows:

Perpendicular to axis 48 and rigid therewith is bevel gear 61 which meshes with bevel gear 62 which in turn is perpendicular to the line of trunnions 53 and centered thereon. Rigid with gear 62 is worm 63 which meshes with worm gear 64, which in turn is adapted to actuate, through the proper shaft and gear combination, gear 65 of the longitude dial assembly.

4. Latitude dial assembly

As described above (see section B2 of this specification) gear 42 of the latitude dial assembly (see Figs. 7 and 9) is actuated by projected-distance transmitting assembly 10 so as to rotate in proportion to the projection onto the meridian of the distance travelled by the vehicle, which is substantially proportional to the angular measure of latitude traversed by the vehicle.

Latitude dial 56, and the remaining latitude dials 66 are each rotatably mounted upon a common shaft 67. Rotatably mounted upon the same shaft just to the right of dial 56 is sleeve 68. At the left end of this sleeve disc 69 is mounted so as to be longitudinally slidable upon the sleeve but keyed to it so as to always rotate with it. Gear 70 is similarly mounted on the sleeve near the right end thereof, and is so positioned as to mesh with gear 42 so long as the assembly is set for northern latitude. Spring 71 is arranged to force slidable disc 69 toward the left, bringing it firmly against dial 56, so that the friction of the disc against the dial will normally force the dial to rotate in unison with disc 69, sleeve 68 and gear 70.

Dial 56 is connected to dials 66 by carry mechanism adapted to carry one unit to the next succeeding dial to the left as each dial completes each revolution, each of the dials in my preferred embodiment being graduated with ten units to the circumference except the dial adjacent to dial 56 which is graduated with six units. This carry mechanism may be any suitable kind such as customarily used in counting mechanism, and I therefore do not indicate the form thereof, nor claim any originality relative thereto.

In my preferred embodiment the two left dials register degrees, while the two numeral dials on the right register minutes. By properly establishing the gear ratios the motion transmitted to dial 56, which as I have already indicated will be proportional to the movement of the vehicle through latitude, may be made such that if the registration on the dials is that of the latitude of the vehicle at any one time and place, it will serve to keep the registration continually that of the latitude of the vehicle as it moves from place to place, providing the vehicle is moving under the control of the directional means which serves to orient the projected-distance transmitting assemblies, and providing the corrections for magnetic variation, drift, and the factors affecting the ratio of engine speed to ground speed are properly made.

As outlined in connection with my description of the projected-distance transmitting assemblies, the direction of motion transmitted to the dials is automatically controlled by the orientation of assembly 10, the arrangement being such that when the vehicle is moving on any northerly course (with the apparatus positioned as thus far described) the latitude registration will numerically increase, while when it is moving on any southerly course it will numerically decrease. If the vehicle crosses the equator, however, the effect is exactly reversed, the change of latitude registration for movement along any course in the Southern Hemisphere being numerically equal but opposite in direction, to that for the same movement along the same course in the Northern Hemisphere. I therefore provide means for automatically reversing the direction of actuation of the latitude dials whenever the equator is crossed and for automatically indicating the hemisphere in which the registration is being made, as follows:

Positioned laterally a short distance from gear 42 I provide gear 72 of the same size as gear 42. Rigid with gear 72 is gear 73 which meshes with an equal gear 74 rigid with gear 42, thus keeping gear 72 at all times rotating at a rate equal and opposite to that of gear 42. The entire arrangement is such that if gear 70 is shifted laterally by the proper amount it will move out of contact with gear 42 and mesh with gear 72 thereby reversing the direction of actuation of the latitude dials for a given orientation of assembly 10. In order to provide for such shifting of gear 70 I provide rigid therewith cylinder 75 having a circumferential groove 76 into which fits shifter 77. To prevent the rotation of shifter 77, projection 78 thereof is guided between guides 79 parallel to shaft 67.

On sleeve 68 between cylinder 75 and dial 56 is mounted dial 80 and cylinder 81 rigid therewith. These are so mounted as to be freely rotatable with respect to the sleeve but not longitudinally slidable thereon. At two opposite points on the circumference of dial 80 appears the letter "N", designating north latitude, and at the two opposite points midway between these letters is the letter "S", designating south latitude. Passing continuously around cylinder 81, but curving back and forth longitudinally, is a groove 82, into which at two diametrically opposite points extend two pins 83 rigid with shifter 77. The shape of groove 82 is such that it is furthest to the right at the points that are occupied by pins 83 when either of the letters "N" on dial 80 are exposed, and furthest to the left at the points occupied by said pins when either of the letters "S" are exposed. The groove is shaped so as to slant smoothly between these positions, so that a quarter revolution of cylinder 81 will move the pins between their furthest right and furthest left positions, necessarily moving by the same amount shifter 77 and gear 70. The entire arrangement is therefore such that whenever dial 80 is set for an "N" registration gear 70 will be in a position to mesh with gear 42 and to actuate the dials so as to numerically increase with northerly movement, while when dial 80 is set for an "S" registration gear 70 will mesh with gear 72 and actuate the dials in the opposite direction. Automatic change of indication of hemisphere and of the direction of actuation of the dials, when the vehicle crosses from one hemisphere to the other, is provided by automatically rotating dial 80 through a quarter revolution whenever the latitude dials register zero (00° 00'), in the following manner:

Rigidly attached to each numeral dial 56 and 66 is a disc 84 (see Fig. 7), having in its periphery a notch 85 (see Fig. 8). In line with each such disc is an arm 86 having a projection 87 so positioned and shaped as to fit into notch 85 at one particular position of rotation of the disc, and so that any rotation of the disc away from such position will force the projection out of the notch. Each disc 84 is so positioned with respect to its respective dial that its respective projection 87 will be in a position to drop into notch 85 when the dial registers "0". Arms 86, however, are all rigid with shaft 88 so that no projection can drop into its respective notch unless all notches are simultaneously positioned to receive their respective projections, in which case they may all drop into the notches in unison rotating shaft 88 in so doing. This, of course, can only take place when all dials register "0" simultaneously which would indicate that the vehicle was at the equator and passing from one hemisphere to the other. Also rigid with shaft 88 is arm 89, to which is attached spring 90 pulling on arm 89 in such a manner as to supply the necessary tension for forcing projections 87 into notches 85. Rigid with arm 89 is pin 91 extending into the plane of actuator 92 to which four projections 93 are pivotally attached, the inner end of each being normally held against block 94 by the tension of springs 95 and 96. The entire arrangement is such that the rotation of shaft 88, incidental to projections 87 dropping into notches 85, will move pin 91 forward in such a manner as to engage one projection 93 and rotate actuator 92 through a quarter revolution. As dial 56 thereafter moves away from its "0" registration its respective projection 87 will be forced out of its notch, forcing pin 91 back into its initial position, the pin sliding past the projection 93, which is then positioned to be engaged upon the next crossing of the equator, by rotating same upon its pivot 97. The quarter revolution of actuator 92 is transmitted to dial 80 and cylinder 81 by means of gear 98 which is rigid with the actuator and meshes with gear 99, which in turn meshes with gear 100 rigid with the dial and cylinder.

Dial 80 has four positions, spaced a quarter revolution from each other, that it may properly assume, and in order to insure its being brought accurately into and restrained in each of these positions, and to eliminate the possibility of its sliding into or maintaining any intermediate position, I provide member 101, rigid with gear 99, and having on its circumference notches 102 spaced at the angular interval through which that member is rotated in effecting a quarter revolution of dial 80. Roller 103 is supported, and pressed against member 101, by spring leaf 104, and is so positioned that it will be in the bottom of a notch just as dial 80 comes into an operative position, thus serving to accurately centralize member 101 and dial 80 into whatever operative position the actuating mechanism may have approximately brought them.

To provide for convenient resetting of the dials by the operator I provide bevel gear 105 rigid with knob 106, and normally held clear of the dials by spring 107, but so positioned that when the knob is pressed in by the operator it will mesh with gear 58 and rotate dial 56 in proportion to the rotation of knob 106 by the operator.

5. *Longitude dial assembly*

As will be observed from Figs. 10 and 11 the longitude dial assembly is generally similar to the latitude dial assembly, gear 108 being driven either by gear 65 or gear 109 (which are so connected as to have equal and opposite rotations) the selection depending upon how gear 108 is laterally positioned by dial 110, which is arranged to register "W" or "E" for west or east longitude respectively and which operates to shift gear 108 through the action of groove 111 on shifter 112 just as dial 80 shifts gear 70. The rotation of gear 108 drives sleeve 113 and disc 114, which by friction drives dial 115, which in turn operates dials 116, 117, 118, and 119 through proper carry mechanism, just as gear 70 operates dials 56 and 66. Knob 120 serves to reset the dials just as does knob 106 in the latitude dial assembly, and actuator 121 serves to rotate dial 110 through a quarter revolution just as actuator 92 does with dial 80. The only real differences in the two assemblies are the addition of dial 119 to allow of registering angles up to 180° 00' and provision for reversing the hemispherical indication and the direction of actuation when the dials indicate either 00° 00' or 180° 00', this last mentioned result being accomplished as follows:

Rigid with each numeral dial is a disc 122 which has a notch 123 into which drops a projection from a corresponding arm 124 if all dials indicate "0" simultaneously, thereby rotating shaft 125 with which arms 124 are rigid and moving pin 126 rigid with arm 127 so as to produce a quarter revolution of actuator 121, just exactly as a quarter revolution of actuator 92 is produced when the latitude dials register zero. In addition I provide rigid with dial 119, which registers hundreds of degrees, a disc 128 having a notch 129 into which may drop a projection on lever 130 when the dial registers "1", and a disc 131 rigid with dial 118, which registers tens of degrees, having a notch 132 into which may drop a projection on lever 133 when the dial registers "8". Levers 130 and 133 are both rigid with shaft 134 with which lever 135 is also rigid. From lever 135 there projects a pin 136 which is arranged to engage and rotate actuator 121 through a quarter revolution, in a manner exactly similar to that of pin 126, whenever shaft 134 is rotated by the projections on levers 130 and 133 dropping into their respective notches. This can, of course, only take place if dial 119 registers "1" and dial 118 registers "8" simultaneously, which will only take place at the instant that the registration builds up to 180° 00'. The direction of registration will immediately reverse as this reading is reached and the levers drop into their respective notches, and the continuation of the same general motion of the vehicle will proceed to build the registration downward. Thus if a vehicle passes out of the hemisphere of west longitude into that of east longitude either by passing westerly across the 180th meridian or easterly across the base meridian, the registration of dial 110 will automatically change from "W" to "E", and the numerical effect of easterly and westerly movements of the vehicle upon the registration of the dial will be reversed.

6. *Summary of operation*

In practice the operator may set the latitude dials and the longitude dials to the latitude and longitude, respectively, of the initial point, by means of knob 106 and 120, respectively. In the case of aircraft, for example, this should be the point at which the operator throws the craft under the control of the directional element which orients the projected-distance transmitting assemblies. For instance, if the pilot knows from experience that he will want to throw the craft onto automatic control as he passes over a point about one mile northwest of the field from which he takes off, he may before taking off set the dials for the latitude and longitude of such a point, having lever 8 in its "off" position, throwing it onto the "on" position as he passes approximately over such point and throws the craft onto automatic control.

Before taking off, lever 19 may be rotated so as to correct for the estimated projection of the prevailing wind in the direction of flight. After the craft is under way this may be corrected by timed observations on the ground, by reports from other stations or craft, and by noting and allowing for the resultant error of the meter registration as the craft passes over successive points of known latitude and longitude en route.

As lever 8 is thrown into its "on" position disc 1 commences to revolve at a speed proportional to the engine speed, and to move at its points of contact with assemblies 10 and 11 at a lineal speed proportional to the engine speed times the radius from center of disc to points of contact, as said radius is fixed by crank 19. This motion will be transmitted to discs 27 of assemblies 10 and 11 in proportion to the sines of their respective angles of inclination to the radius of disc 1 through the point of contact. Crank 40, which sets the course to be followed, also orients assemblies 10 and 11 so that the angles that their respective discs 27 make with the above mentioned radius will be equal respectively to the angles which the course so set makes with the parallel of latitude and with the meridian, (drift and magnetic variation being independently corrected for so that they do not introduce any error into the course), resulting in assembly 10 being actuated at a speed proportional to the speed of the craft projected onto a north and south line, while assembly 11 will be actuated at a speed proportional to the speed of the craft projected onto an east and west line. The length of a degree of latitude being substantially the same at all points on the earth's surface, the motion of assembly 10 is transmitted directly to the latitude dials. The motion of assembly 11, however, is transmitted to the longitude dials through a longitude-conversion assembly in which a disc of constant circumference (disc 44) actuates a sphere 47 by contacting with it along a circle proportional at various latitudes to the length of the degree of longitude at the respective latitudes. This results in the latitude and longitude dials being actuated substantially in proportion to the angular measure of latitude and longitude traversed by the vehicle, which results in the registration of the dials being continually changed to that of the point at which the vehicle is located at the instant of registration.

As previously described in detail, dial 80 is arranged to indicate whether the craft is in the Northern or Southern Hemisphere, and dial 110 whether it is in the Eastern or Western Hemisphere as referred to the base meridian, and arrangements are provided by which, whenever the dials register the latitude or longitude incident to the passing of the craft from one of these hemispheres to the other, the proper dial changes indication of hemisphere and the corresponding numeral dials are reversed as to their response to the movement of the craft.

To be sure, the resulting registration will be no more exact than the initial registration, and the resultant of the ensuing corrections for magnetic variation, and in the case of aircraft for drift and head or tail winds, but the instrument may be constructed so as to automatically give the position of the craft as accurately as it could be determined by the most accurate dead reckoning. A convenient method of operation on aircraft is for the pilot to set the latitude and longitude of the initial point as previously described, and then to occasionally check the registration as he passes over points of known latitude and longitude. If the registration differs appreciably from the true value he may reset the dials by means of knobs 106 and 120, and if the resultant error is approximately in line with the path of motion, as would be probable in view of the fact that the factors affecting true ground speed are the only ones at all difficult to accurately allow for with the apparatus as described, crank 19 may be moved to make such correction in longitudinal speed allowance as would seem to be called for.

While in the above description of my preferred embodiment certain particular references have been made to aircraft installations it will readily be observed that the apparatus is adapted, with possibly some minor changes in the directional element or other parts, to use on any kind of vehicle, and particularly on vessels of all kinds. It is further to be understood that the embodiment described herein is only one of the many embodiments this invention may take, and I do not wish to be limited in the practice of the invention, nor in the claims, to the particular embodiment set forth.

What I claim is:

1. In a longitude meter the combination of a movable surface, a disc perpendicular thereto and driven by friction thereon, means adapted to move the first named surface in such a manner that its lineal speed at point of contact with the disc will be substantially proportional to the speed of the meter with respect to the earth, and means adapted to rotate the disc about an axis through the point of contact and perpendicular to the movable surface in such a manner as to maintain an angle between the plane of the disc and the direction of motion of the surface complementary to the angle between the path of motion of the meter and the meridian.

2. In a latitude and longitude meter the combination of a moving surface, two discs in contact with the opposite sides thereof and adapted to be maintained in planes rotatable with respect to the direction of motion of the surface, but always mutually perpendicular.

3. In a latitude and longitude meter the combination of a disc adapted to be revolved as the meter is moved with respect to the earth, two other discs contacting with opposite surfaces of the first named disc, at points separated from each other in a direction parallel to the axis of the first named disc, and means adapted to adjust the angles between the two last named discs and the radii of the first named disc at the respective points of contact, maintaining all three discs, however, in mutually perpendicular planes.

4. In a latitude and longitude meter the combination of a movable surface, a latitude actuator and a longitude actuator contacting with the opposite sides thereof, and means for rotating both of said actuators with respect to the direction of motion of the movable surface by amounts equal to the changes in direction of the motion of the meter with respect to the earth, said means including a framework supporting each such actuator, a gear rigid with each such framework and meshing with another gear rigid with a gear actuated by the directional means indicating or controlling the direction of motion of the meter with respect to the earth.

5. In a latitude and longitude meter the combination of a revolving disc, latitude and longitude actuators driven thereby, and means adapted to adjust the lineal speed of the disc at its points of contact with said actuators, including supports for the actuators, a support for the revolving disc, and a threaded shaft adapted by its rotation to alter the distance between the two sets of supports.

6. In a longitude meter the combination of an actuator adapted to move at a speed substantially proportional to the lineal speed of the meter with respect to the earth, another actuator adapted to be operated by said first named actuator at a speed substantially proportional to the lineal speed of the meter through longitude and to actuate an assembly adapted to operate at a speed substantially proportional to the angular measure of the speed of the meter through longitude, and registering dials adapted to be actuated by said assembly.

7. In a longitude meter the combination of a member adapted to be moved in proportion to the east or west distance traversed by the meter, and means for converting such movement into the angular value of longitude traversed by the meter.

8. In a longitude meter the combination of a disc actuated so as to move in proportion to the distance moved by the meter through longitude, a sphere adapted to be rotated upon a diametrical axis by friction of the disc, and means for adjusting the angle between the disc and the axis of the sphere.

9. In a longitude meter the combination of a disc adapted to be moved in proportion to the easterly or westerly projection of the distance moved by the meter, and a spheroidal body with center in the plane of the disc, adapted to be rotated upon a diametrical axis and to have the angle between said axis and the disc altered in proportion to the change in latitude.

10. In a longitude meter the combination of a rotatable sphere, a rotatable disc contacting therewith, a shaft supporting said disc, a bearing for said shaft rotatable upon an axis perpendicular to the direction of the shaft and to that of the line joining the centers of the disc and the sphere, and a spring tending to rotate the bearing on said axis and maintain a uniform pressure of the disc against the sphere.

11. In a longitude meter the combination of a rotatable sphere, a disc contacting therewith, a support for the sphere adapted to be moved so as to alter the inclination of the axis of the sphere in such a way as to alter the distance from the axis to the point of contact of the sphere with the disc, and means for transmitting the rotation of the sphere to other parts of the meter at any position of the sphere, said means including a gear concentric with the axis of the support and adapted to be rotated by the rotation of the sphere.

12. In a latitude and longitude meter the combination of a rotatable disc, a rotatable sphere in contact therewith having its center in the plane of the disc, a pivoted support for the sphere adapted to be rotated so as to vary the distance from the axis to the point of contact, and latitude dials adapted to register the latitude of the meter and to actuate the pivoted support so as to maintain the angle between the plane of the disc and the axis of the sphere equal to the complement of the latitude registered.

13. In a latitude and longitude meter the combination of latitude dials, a rotatable sphere, a pivoted support for same, means connecting the pivoted support to the latitude dials in a manner adapted to rotate the support upon its pivots by an angle equal to the change in registration of the dials, said means including a gear actuated by one of the dials, a geared quadrant rigid with the pivoted support, and a series of gears, worms, and shafting adapted to transmit motion to the geared quadrant in proportion to the movement of the first mentioned gear.

14. In a meter the combination of an actuator, numeral dials actuated thereby, and means adapted to automatically reverse the relative direction of actuation when the registration on the numeral dials reaches a pre-determined value, said means including a notched disc actuated by each dial, a projection corresponding to each disc and adapted to drop into the notch when and only when the dial is set for the reading it holds in registering the predetermined value, a shaft adapted to be rotated only when all such projections are in a position to simultaneously enter their respective notches, and a lever adapted to be actuated by the rotation of said shaft and to actuate the reversing means when so actuated.

15. In a meter means adapted to automatically reverse the dials when all dials simultaneously register zero, said means including a disc rigid with each dial, a notch in each disc, a projection corresponding to each disc and adapted to fit into the notch when the dial registers zero, a shaft rigid with all such projections and adapted to rotate when all projections simultaneously enter their respective notches, a member moved by such rotation, an actuator engaged by said member when so moved, and reversing means operated by said actuator when so engaged.

16. In a meter automatic reversing means including an actuator having pivoted projections normally extended by springs, a member controlled by the registration on the meter and adapted at a certain registration to move so as to engage one of the projections and rotate the actuator through the proper angle to reverse the meter.

17. In a meter the combination of an actuator adapted to reverse the direction of operation of the meter as it passes from each operative position to the next successive operative position, and means adapted to retain the actuator in each successive operative position and prevent its maintaining any intermediate positions, said means including a disc rotatably displaced by each movement of the actuator, notches in the disc at angular intervals corresponding to the angular movement given the disc by each actuation, and a spring-operated member adapted to fit into said notches.

18. In a longitude meter the combination of numeral dials, and means adapted to automatically reverse the numeral dials whenever they register zero or the longitudinal registration indicating a half circle, said means including a disc in conjunction with each dial having a notch into which a corresponding projection may drop just when the dial registers zero, a series of corresponding projections all rigid with a common axis and adapted to actuate the reversing means when rotated by the projections dropping into their notches, another series of notched discs, one in conjunction with each dial of the minimum series of dials which assume distinctive positions upon registration of the half circle longitude, a series of projections corresponding to this series of discs, this series being rigid with their own common shaft, and means actuated by the rotation which said shaft receives when these projections drop into their respective notches to actuate the reversing means.

19. In a meter the combination of an actuator, numeral dials reversibly connected thereto, another dial adapted to indicate by its registration the direction of connection existing, and means adapted to simultaneously change the direction of connection and the registration of said last mentioned dial, said means including a cylinder actuated by said dial, a groove passing circumferentially around said cylinder at varying directions and angles to the elements thereof, two gears driven in opposite directions by the actuator, a third gear adapted to be selectively meshed with one or the other of said gears, and a shifter positioned by the groove above mentioned and operating to shift said last mentoned gear.

20. In a latitude or longitude meter the combination of actuating means, numeral dials reversibly connected thereto, another dial adapted to indicate the hemisphere of the value registered on the numeral wheels, and means adapted to automatically change the indication of hemisphere and reverse the connection between the numeral dials and the actuating means when the dials register the limiting numerical value of a hemisphere, said means including an actuator the operation of which is controlled by the registration of the dials, means connecting the actuator to the hemisphere dial in such a manner that one actuation of the actuator will rotate the hemisphere dial from one regisration position to the next successive registration position, and means connecting the hemisphere dial to a selective gear controlling reversing in such a manner that the rotation of the dial from one registration position to the next successive position will shift the gear from the position giving one direction of actuation to that giving the opposite direction of actuation.

21. In a meter the combination of a revolving disc, another disc perpendicular thereto, driven by friction thereon and adapted to be inclined at various angles to the radius of the driving disc, and means adapted to vary the distance from the center of the driving disc to the point of contact of the driven disc.

22. In a latitude meter the combination of a rotating disc, a second disc contacting with the surface thereof and adapted to be adjusted radially on the first named disc with respect to ground speed, and to be adjusted rotatably thereon with respect to course, and registering dials adapted to be actuated by said last named disc.

23. In a device of the class described the combination of a revolving disc, another disc perpendicular thereto, driven by friction thereon, rotatable on axes respectively perpendicular to the two discs, and adapted to be positioned at variable distances from the center of the first named disc.

24. In a device of the class described the combination of a rotatable disc, another disc perpendicular thereto, driven by friction thereon, and adapted to have its speed of rotation relative to that of the first named disc adjusted by radial movement of the point of contact with the first named disc, and independently adjusted by angular movement of the plane of the driven disc with respect to the radius of the driving disc to the point of contact.

25. In a device of the class described the combination of a moving surface and a disc driven by friction thereon, said disc and said surface being relatively adjustably supported to permit differential inclination of the disc to the direction of motion of the surface, and to permit adjustment of the line of its contact with said surface.

26. In a device of the class described the combination of a moving surface of which different portions are moving at different speeds, and a disc driven by friction thereon, said disc and said surface being relatively adjustably supported to permit differential inclination of the disc to the direction of motion of the surface, and to permit adjustment of the line of its contact with the surface to permit bringing it into driving relation with portions of the surface moving at different speeds.

27. In a longitude meter the combination of a rotatable disc, another disc perpendicular thereto, driven by friction thereon, and so supported with reference to the driving disc as to permit it to be inclined to the radius of the driving disc to the point of contact at an angle equal to that between the path of motion of the meter and the meridian, and to permit of adjusting at will the distance of the driven disc from the axis of rotation of the driving disc.

28. In a latitude meter the combination of a moving surface and a disc driven by friction thereon, said disc and surface being so supported as to permit the disc to be inclined to the direction of motion of the surface at its contact therewith at an angle equal to that between the meridian and the path of motion of the meter, and to permit of lateral motion of the disc to change its line of contact with said surface.

29. In a longitude meter the combination of a surface of which different portions are moving at different speeds, and a disc driven by friction thereon, said disc and surface being relatively adjustably supported to permit changing the inclination of the disc to the direction of motion of the surface with changes in the course traversed by the meter, and to permit adjustment of the line of its contact with the surface to bring it into driving relation with portions of the surface moving at different speeds.

30. In a longitude meter the combination of an actuator driven at a speed bearing a functional relation to the speed of the meter with respect to the earth, another actuator controlled thereby to move at a speed substantially proportional to the lineal speed of the meter through longitude, and a member controlled by said second actuator to move at a speed proportional to the angular measure of the speed of the meter through longitude.

31. In a longitude meter the combination of a frame, a surface movable with respect to said frame, a disc driven by friction on said surface at a speed proportional to the east-west component of the speed of the meter with respect to the earth, and a member driven by said disc at a speed proportional to the angular measure of the movement of the meter through longitude.

32. In a longitude meter the combination of an element driven at a speed bearing a functional relation to the speed of the meter with respect to the earth, another element controlled thereby to move at a speed proportional to the lineal speed of the meter through longitude, and means controlled by said second element for converting from linear measure of longitude to angular measure thereof.

33. In a device of the class described the combination of a moving surface, an actuator contacting therewith, a frame in which the actuator is rotatably supported, said frame being supported to permit of rotation thereof about an axis perpendicular to the moving surface at the point of contact of the actuator therewith and to permit of displacement thereof parallel to such axis, and a spring to press the frame toward the surface and cause the actuator to press smoothly against the moving surface.

34. In a device of the class described the combination of two actuators frictionally driven by a common member, means for simultaneously adjusting the relative positions of the actuators and the driving member in such a manner as to simultaneously alter by identical ratios the rate of motion transmitted to the two actuators, and means for indicating the resulting position of adjustment.

35. In a device of the class described, the combination of a disc, a second disc driven by friction therewith, and a plurality of means for varying the relative rotational speeds of said two discs.

36. In a device of the class described the combination of a revolving disc, two actuators driven by contact therewith, and means for simultaneously altering the radii of the revolving disc to the respective points of contact of the two actuators and for continuously maintaining equality of said two radii.

37. In a device of the class described the combination of an actuator different portions of which are moving at different speeds, two members driven thereby, and means for simultaneously bringing the members into driving relationship with selected portions of the actuator and for continuously maintaining the two members in driving relationship with portions of the actuator moving at identical speeds.

38. In a device of the class described the combination of two actuators frictionally driven by a common member, and means for simultaneously changing the relative positions of the actuators and the driving member in such a manner as to simultaneously alter by identical ratios the rate of motion transmitted to the two actuators.

39. In a latitude and longitude meter the combination of a latitude indicator, a rotatable sphere, a pivoted support for same, means connecting the pivoted support to the latitude indicator in a manner adapted to rotate the support upon its pivots by an angle equal to the change in registration of the indicator.

40. In a device of the class described the combination of an actuator, an indicator actuated thereby, and means adapted to automatically reverse the relative direction of actuation when the registration of the indicator reaches a predetermined value.

41. In a device of the class described the combination of registering mechanism, and a control member adapted to reverse the direction of operation of said mechanism as the control member passes successively in the same direction from each operative position to the next successive operative position.

42. In a device of the class described the combination of registering mechanism, a member and means controlled thereby for reversing the direction of operation of said mechanism upon the passing of the member from each operative position to the next successive operative position, and means for centralizing the member in each operative position.

43. In a meter the combination of actuating means, an indicator reversibly connected thereto for registering angular values, means for reversing the connection between the actuating means and the indicator, and means for rendering said last named means operative upon the indicator registering the maximum or minimum latitude or longitude of a hemisphere.

44. In a latitude or longitude meter the combination of actuating means, registering means reversibly connected thereto, an indicator for indicating the hemisphere of the value registered on the registering means, and means automatically operative when the registering means registers the minimum or maximum longitude or latitude of a hemisphere to change the hemisphere indication and reverse the connection between the actuating and the registering means.

45. In a device for continuously indicating the position of a ship, the combination of mechanism for resolving the course of the ship into the rectangular components, means for introducing ship speed into the mechanism, means operated by said mechanism and said means for converting ship speed into equivalent rectangular speed components, an indicator operated according to the component speeds for continuously indicating the latitude and longitude of the ship, and means controlled by the latitude indicator for varying the indication of the longitude indicator.

46. In a device for continuously indicating the position of a ship, the combination of mechanism for resolving the course of the ship into rectangular components, means for reproducing the speed of the ship along its course, a device operated jointly by said means and mechanism for reproducing the relative speeds of the ship along said rectangular components, and means operated by said device for continuously converting the relative component speeds of the ship into degrees of latitude and longitude and indicating the same, said converting means including mechanism for compensating for latitude changes.

47. In a device for continuously indicating the position of a ship, the combination of mechanism for resolving the course of the ship into rectangular components, means for reproducing the speed of the ship along its course, a device operated jointly by said means and mechanism for reproducing the relative speeds of the ship along said rectangular components, means operated by said device for continuously converting the relative component speeds of the ship into degrees of latitude and longitude and indicating the same, and mechanism operated by the last-named means for correcting the longitude indication in proportion to the latitude.

48. In a device for continuously indicating the position of a ship, the combination of mechanism for resolving the course of the ship into E-W and N-S components, means for reproducing the speed of the ship along its course, a device operated jointly by said means and said mechanism for reproducing the equivalent speeds of the ship along the E-W and N-S components, means operated by the device for converting the E-W equivalent speed into longitude indications, means operated by the device for converting the N-S equivalent speed into latitude indications, and mechanism operated by said last-named means for correcting the longitude indication in accordance with latitude changes.

49. In a device for continuously indicating the position of a ship, the combination of mechanism controlled by the compass for resolving the course of the ship into E-W and N-S components, a member rotated in proportion to the speed of the ship, means driven by and adjustable on the surface of the member by the mechanism in proportion to the N-S component, a second means driven by and adjustable on the surface of the member by the mechanism in proportion to the E-W component, an indicator operated by the first-named means for indicating latitude, and an indicator operated by said last-named means and modified by said first-named means for indicating longitude.

50. In a device for continuously indicating the position of a ship, the combination of mechanism controlled by the compass for resolving the course of the ship into E-W and N-S components, a member rotated in proportion to the speed of the ship, means driven by and adjustable on the surface of the member by the mechanism in proportion to the N-S component, a second means driven by and adjustable on the surface of the member by the mechanism in proportion to the E-W component, an indicator operated by the first-named means for indicating latitude, an indicator operated by said last-named means for indicating longitude, and mechanism operated by said first-named means for correcting the longitude indications in accordance with the latitude indications.

51. A device for continuously indicating the position of a ship, comprising a disc rotated in proportion to the speed of the ship, means engaging the disc and actuated thereby for resolving the direction of travel of the ship into two components of fixed direction relatively to the ship compass, devices driven by the means for converting the components into latitude and longitude indications, and means controlled by one of said devices for correcting the longitude indications in accordance with changes in latitude.

52. A device for continuously indicating the position of a ship, comprising a disc rotated in proportion to the ship's speed, members controlled by the ship compass and relatively movable on the surface of the disc so as to be driven thereby, said members being adjustable in proportion to E-W and N-S components of the ship's course, a longitude indicator operated by the E-W member, a latitude indicator operated by the N-S member, mechanism operated by the latitude indicator, and connections between said mechanism and the longitude indicator for modifying the longitude readings.

53. In a device of the class described, an element moved in proportion to the distance traversed, a direction indicator, means controlled by said indicator and capable of continuous movement for determining the projected values of said distance in two given directions, and means responsive to a change in one of said projected values for modifying the other.

54. In a longitude meter the combination of a member continuously moved in proportion to the east or west distance traversed by the meter, and means controlled thereby for converting such movement into the angular value of longitude traversed by the meter.

55. In a device of the class described the combination of a latitude meter and a longitude meter including an element continuously driven at a speed proportional to the lineal speed of the meter through longitude, and means controlled jointly by said latitude meter and said element for continuously moving another element at a speed proportional to the angular speed of the meter through longitude.

56. In a vehicle, an element continuously moved in proportion to the latitude range traversed by the vehicle, an element continuously moved in proportion to the longitude range traversed, and means controlled by the former element to connect the actuation of the latter element for changes in latitude.

57. In a craft the combination of a member moved in proportion to the distance traversed by the craft, mechanism controlled by the craft's compass for continuously converting such movement into the east-west projection thereof, and means controlled by said mechanism for converting said projection into the angular measure of longitude traversed by the craft.

58. In a craft the combination of an element moved in proportion to the distance traversed by the craft, mechanism controlled by the craft's compass for continuously converting such movement into the east-west component of the distance traversed, and mechanism similarly controlled for converting the movement into the north-south component of said distance, and means controlled by said latter mechanism for altering the operation of the former mechanism in accordance with latitude changes.

59. In a longitude indicating device, a member rotatable at a speed substantially proportional to the lineal speed of the meter with respect to earth, compass-controlled transmission mechanism driven thereby, and a latitude register controlling a second transmission mechanism driven by said first transmission mechanism.

HAROLD T. AVERY.